Nov. 13, 1928.  W. STUEBING, JR  1,691,900
EXERCISING MACHINE
Filed Jan. 14, 1927   2 Sheets-Sheet 1
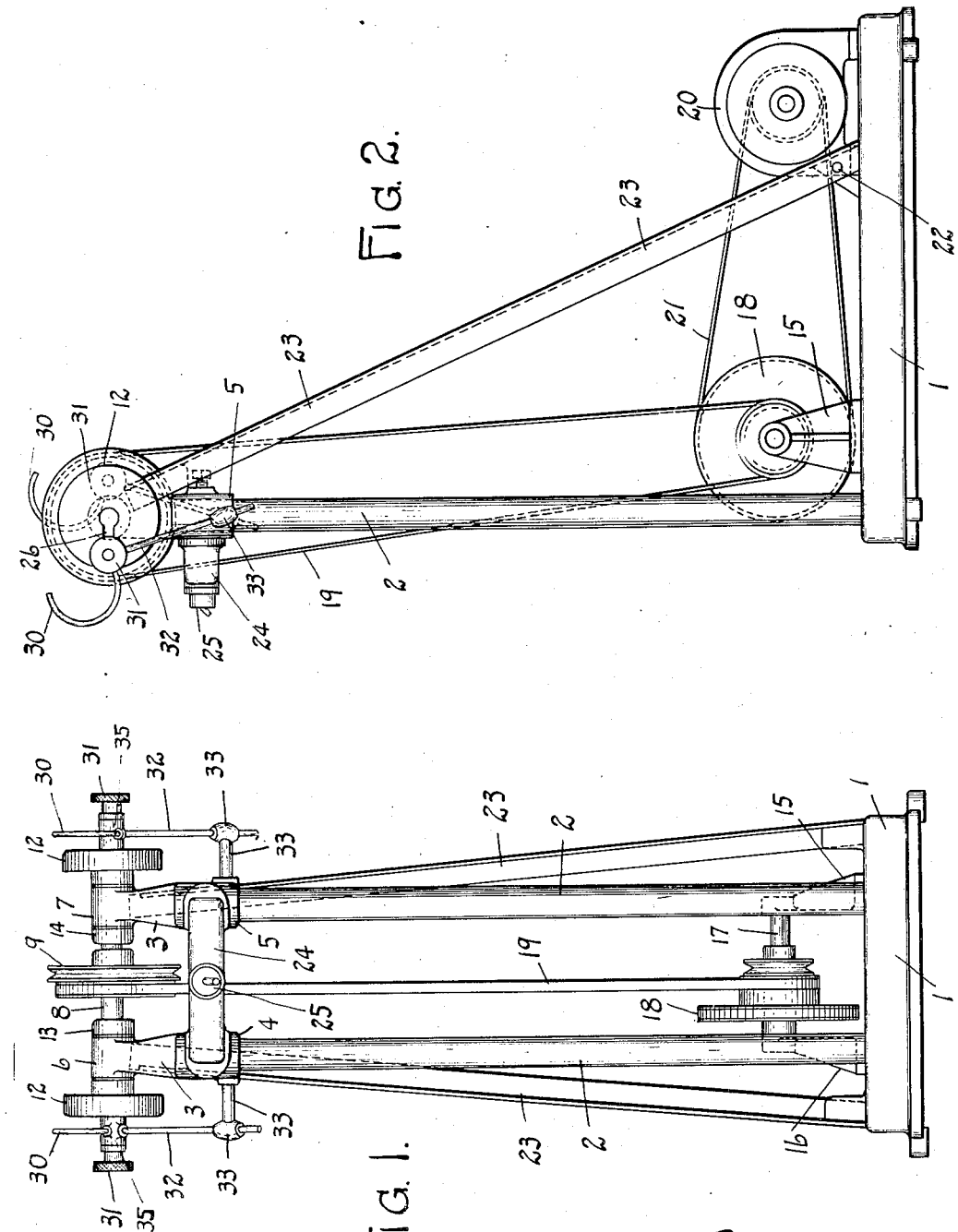

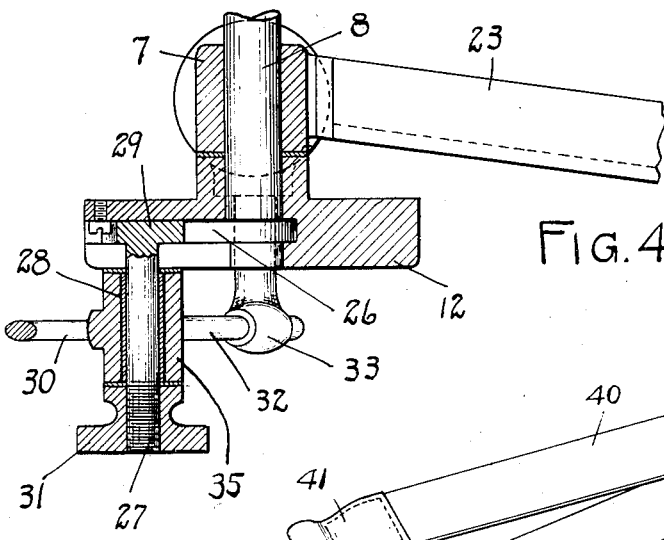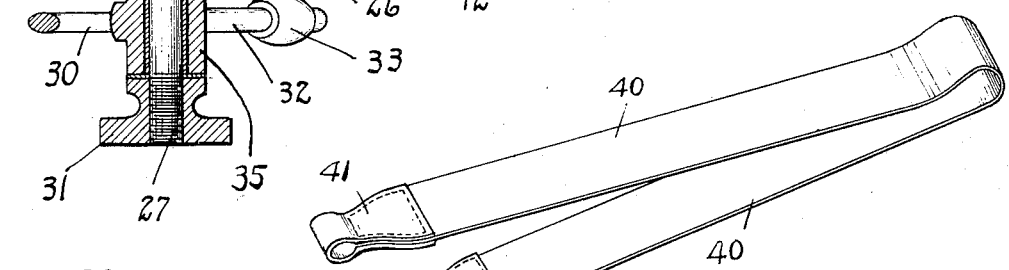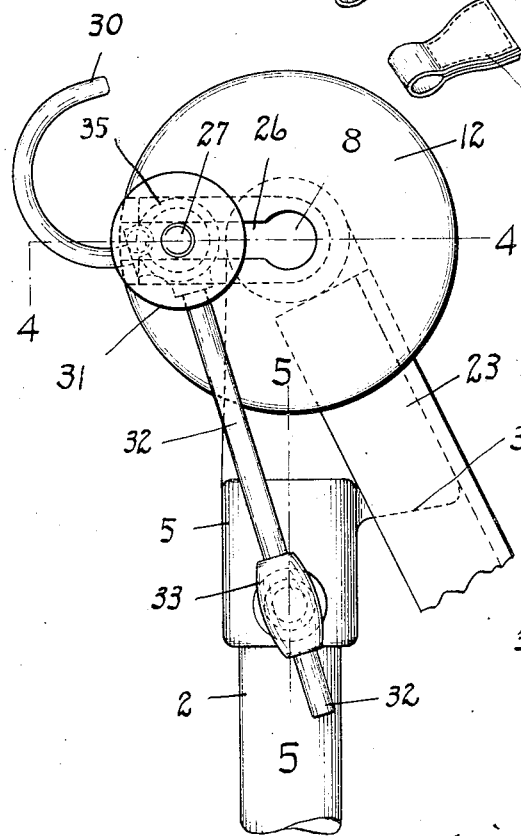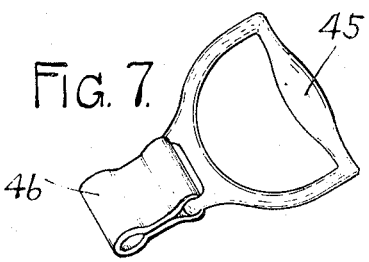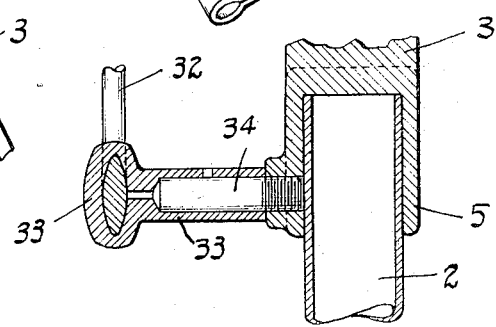

Patented Nov. 13, 1928.

1,691,900

UNITED STATES PATENT OFFICE.

WILLIAM STUEBING, JR., OF CINCINNATI, OHIO.

EXERCISING MACHINE.

Application filed January 14, 1927. Serial No. 161,108.

My invention belongs to that class of exercising machines, which are used not only for exercising purposes, but also for massage purposes. It is very simple in construction, cheap of manufacture and highly efficient in use. Any layman or even a patient can use the machine on account of its efficiency and it does not need an expert operator or attendant. All parts needing massage can be reached and thorough body stimulation results.

One of the salient features of my invention consists in the use of hooks to which the belt can be attached, the supports for said hooks moving in a circular path the hooks traveling along with them, in a circular path, the hooks however remaining approximately in a vertical position at all times while the hook supports are moving in a circular path.

Its various features and advantages will readily become apparent from the following specification and the appended claims.

In the accompanying drawing forming a part of this specification;

Fig. 1, is a front view of my invention,

Fig. 2, is a side view thereof,

Fig. 3, is an enlarged detail of part of machine shown in Fig. 2, partly broken away, Fig. 4, is a section on line 4—4 of Fig. 3, Fig. 5, is a section on line 5—5 of Fig. 3, Fig. 6, is a perspective view of the applicator or vibrating belt, and Fig. 7, is a perspective view of the vibrating handles.

In the drawing the base of the machine is marked 1, and upon this base I mount two upright posts 2, and securely fasten them in the base 1. At the top of these upright posts I place the housings 3 securely fastened to said posts at the bearings 4 and 5. The housings 3 have the bearings 6 and 7, in which I mount shaft 8, provided at each end or side with a crank disc 12. Collars 13 and 14 securely hold the shaft 8 in position.

On the base 1, at its forward end, I place the housings 15 and 16 which housings carry the shaft 17 on which I mount the driving pulley 18, which has grooves to admit the belt 19 and which belt travels from and connects to pulley 18 on shaft 17 and the pulley 9 on the shaft 8.

The pulley 9 and the pulley 17 have various steps so that two speeds can be given by running the belt 19 in the different steps of the pulleys.

On base 1, near its rear, I mount a motor 20 which drives the pulley 18 by means of the belt 21.

At points 22 on the base 1, I provide the brace bars 23, which connect to the upper housings 3.

Thus it will be perfectly obvious that by means of the posts 2 and the brace bars 23 a rigid frame results by connecting the upper housings to the base 1.

At this point of the machine I also mount the guard 24, which is fastened to the upper housings 3. On the guard 24 I place the electric switch 25, placed in a convenient position for starting and stopping the motor 20. It also allows the electric wires to be slid in the guard 24 and connected down through the posts 2 under the base 1, to the motor 20. The crank discs 12, 12, each have a slot 26. Each of the slots carry a stud 27. Journaled on the studs 27 are the bushings 28; which in turn are mounted in hook supports 35. The hook supports carry the hooks 30 and the guide rods 32 are also supported in the hook supports 35.

Each of the studs 27 has a T-shaped head 29 that slides in the groove 26. A spool shaped bushing 28 is mounted on the stud and may be clamped against the disk by means of a nut 31. When the nut is tightened, the bushing 28 will be clamped in position, and the head 29 will bind against the wall of the groove 26. In this way, the bushing may be adjusted toward and away from the axis of the shaft 8, and be secured in position. The hook supports 35 are rotatably mounted on the bushings 28, so as to freely turn on the same regardless of the position of the latter. The vibrating hooks because of this arrangement and combination of parts and elements are adjustable toward or away from the center of the crank discs 12, and can be locked in place at any point of adjustment, by merely tightening the lock nuts 31 against the bushings 28 on the studs 27. The purpose of this adjustment is to give greater or less vibrating action to the hooks 30.

The vibrating hooks 30 have downwardly extending guide rods 32. These rods, on either side of the machine slide in the rocker arms 33. The rocker arms 33 are mounted on studs 34 in the housings 3, on each side of the machine, see Fig. 5.

In Fig. 6, I show a perspective view of one form of exercising or massage belt 40 having the looped ends 41 which are placed over the hooks 30, and in Fig. 7, I show a hand hold 45 provided with looped ends 40 which pass over the hooks 30. The belt 40 and the loops 41 and 46 may be made of any desirable material. The belt 40 is usually employed for massage and rubbing purposes and the hand hold or grip 45 for exercising purposes.

In operating the device, the motor 20 is started, this operates the belt 21 of pulley 18, which pulley has a part over which a belt 19 passes, operating the shaft 8, by passing over step pulley 9; and as shaft 8 revolves, the discs 12, 12, being securely mounted thereto, likewise revolve, said discs indirectly carrying the hook supports 35, a circular action is given to said hook supports, and the hooks 30 which are mounted on said hook supports travel in a circular path, however the hooks in traveling in a circular path always remain approximately in the same position and plane as they are moving around on the hook supports. The hooks are kept in proper alignment or from flying around loosely, by the guide rods 32 which are guided in the swivels of rocker members 33, said rocker members being pivotally mounted on the bearings 4 and 5.

The disks 12 are so placed on the shaft 8, as to be at 180° with each other, thus one hook is pulling backwardly while one is pulling forwardly. This gives a forward and backward movement to the belt first forwardly and then backwardly. Thus a rubbing or massaging movement is the result.

As the guide rods 32 are connected to the revolving hook supports 35, which carry the hooks 30 said guide rods passing through the rocker arm 33, the guide rods 32 move said hook supports 35 and cause the hooks 30 to assume the position shown in dotted lines in Fig. 2, thus the hooks move in a curved or circular path, guided by said guide rods; at the same time it will be seen that said hooks also reciprocate to a certain extent.

While I have described one preferred form of my invention, it can readily be seen that I can modify or change the construction without departing from the spirit and principle of the invention, and I wish to be understood as claiming any such modifications or changes which fall within the scope of the specification and claims.

What I claim as new and my invention and desire to secure by Letters Patent is:

1. In an exercising machine, hook supports, means for moving each of said hook supports in a circular path, a hook carried by each support, a rod fixed to each support, sleeves through which the rods slide, and mounting means for the sleeves permitting the latter to rock about fixed axes.

2. In an exercising machine, coaxial disks, means for simultaneously rotating said disks, a crank pin on each disk, said crank pins being arranged substantially 180 degrees apart, a hook support pivotally mounted on each of said crank pins, a hook carried by each hook support, a rod fixed to each hook support, sleeves in which the rods slide, and mounting means for the sleeves, permitting the latter to rock about fixed axes.

In testimony whereof, I affix my signature at the city of Cincinnati, county of Hamilton, and State of Ohio, this 31st day of December, 1926.

WILLIAM STUEBING, Jr.